Fig_2

Fig_3

Fig_4

Fig_5

Fig_6

United States Patent Office 3,434,197
Patented Mar. 25, 1969

3,434,197
EXPLOSIVE WELDING
Donald E. Davenport, Palo Alto, Calif., assignor to Singer-General Precision, Inc., Binghamton, N.Y., a corporation of Delaware
Filed Aug. 3, 1964, Ser. No. 387,103
Int. Cl. B23k *27/00, 29/00*
U.S. Cl. 29—470.1                                15 Claims

ABSTRACT OF THE DISCLOSURE

Welding of two or more metallic members is accomplished by explosively driving one member against the other at a sub-sonic rate while excluding the gaseous detonation products from the gap between the members. The members may be pre-cooled and are supported on anvils having similar acoustical properties.

---

This invention relates to method and apparatus for welding metallic members together and more particularly, to improved methods and apparatus for explosive welding.

Explosive welding, if effectively accomplished, offers a number of advantages over electric arc or gas welding, particularly in that the deleterious effects resulting from the high temperatures and impurities associated with arc and gas welding may be avoided. Using arc or flame welding, many metals cannot be welded because the heat generated seriously weakens the pieces which one attempts to weld and because undesirable chemical reactions frequently occur at the welding temperatures. Arc and flame welding are frequently unsatisfactory for various applications for a variety of further reasons. Many metals which cannot be welded using arc or flame welding can be effectively welded using novel explosive welding techniques to be described below. By use of the invention, metal members may be securely welded together without subjecting the work-pieces to elevated temperatures, and without the need for any welding flux. Furthermore, while arc and gas welding in general are capable only of joining two members along narrow lines where the exposed edges of the members mate, explosive welding allows one to "area weld," i.e., to weld together the entire mating surface area of two members, thereby enabling one to provide much stronger bonding of the members.

In explosive welding, an explosive charge is utilized to impact one of two pieces to be welded against the other piece with great force. If sufficient force is used, the impact between the two members results in a bonding of the metal members at their mating surfaces. A good bond, as micro-photographs will show, often requires that the mating surfaces each assume a rippled shape with elevations and depressions in the surface of one member conforming closely to mating depressions and elevations in the surface of the other member. Indeed, when one metallic member is thrown against another metallic member with an impact velocity of the order of 1000 feet per second or greater, the contacting surfaces of both members are cold worked and may form mating ripples in both surfaces. The ripping effect creates new surface areas which are essentially free from surface oxides or corrosion films, whereupon the metallic molecules of the two members become intimately associated with and bonded to each other. Therefore, it will be appreciated that a weld may be accomplished between two metallic members without elevating the temperature and without the use of a flux for cleaning the surfaces.

In prior art explosive welding operations, undesirable voids and unwelded areas occurred, particularly near the edges of areas intended to be welded together. Such voids appear to have occurred in many instances of gases surrounding the work-pieces to be welded and because of gases created by detonation of the explosive have travelled around the edges of one of the work-pieces and have become entrapped between the two work-pieces being welded. The presence of gas between the two work-pieces has several undesirable effects. As the two pieces are driven together, the gas is adiabatically compressed to an extremely high temperature, undesirably heating the metals in the vicinity of the weld joint. Also, the entrapment of gas between the two work-pieces results in a "bubble" which provides an unwelded area. The presence of gas between the two work-pieces also acts as a cushion which undesirably interferes with and slows the moving or flying work-piece reducing the impact velocity and undesirably affects the weld joint. Much larger amounts of explosive are required to drive the work-pieces together if a gas is present between the work-pieces. Thus, it is an important object of the present invention to provide an improved explosive welding method and apparatus which overcomes the adverse effects of the presence of such gases.

In accordance with the present invention, the presence of gas between the two work-pieces is substantially eliminated by two techniques. Firstly, the detonation of the explosive is carried out with both the explosive and the work-pieces situated in a vacuum of approximately $\frac{1}{1000}$ atmospheres, for example. Secondly, and very importantly, the gases created by detonation of the explosive are shielded from the work-pieces by extending the length of the path which any gas created by the detonation must travel in order to get between the work-pieces. By so extending the length of the path, one can insure that a minimum number of gas molecules will get between the work-pieces before they are joined, thereby obviating the abovementioned undesirable effects which the presence of gas otherwise causes.

Prior art explosive welding techniques have resulted in spalling of the work-pieces at their edges. It has been discovered that such spalling frequently may be eliminated by the use of a momentum trap, which presents a shock wave from eroding the edge of the work-pieces as it exits from the work-pieces. Thus, it is another object of the invention to provide explosive welding method and apparatus which does not result in spalling of the work-pieces, and more particularly, it is an object to provide a momentum trap in the form of a buttressing mass positioned against the edge of a work-piece. Obviously, the buttressing mass or momentum trap may become welded to the work-pieces during the explosive welding operation; and it is therefore a further object to provide a simple method and means for removing the momentum trap after completion of the welding operation. More particularly, it is a further object to provide a momentum trap of a material which may be easily dissolved or washed away, or which may have a low melting point and may be easily melted without harm to the work-pieces.

A number of industrial applications arise in which work-pieces having fairly complex shapes must be welded, some such work-pieces having cavities or holes or irregular contours, and some pieces requiring a succession of adjacent welded and non-welded areas. It is a further object of this invention to provide suitable method and apparatus for welding such work-pieces. More particularly, it is an object to provide a momentum trap at each opening or irregular contour within the work-pieces by filling the openings with an easily removable material, such that the welding operation may be made between work-pieces having apparent regular geometric surfaces, and thereafter the filling material may be removed.

Prior art explosive welding techniques frequently have resulted in undesirable bending of one of the two work-pieces being welded. In accordance with the present invention, the chances of occurrence of such undesirable bending is minimized by eliminating reflected shock waves which have caused such bending. Thus, it is a further object of the invention to provide explosive welding method and apparatus which does not result in undesirable deformation of the work-pieces. More particularly, it is an object to provide an anvil or underlying supporting means having an acoustic or shock wave impedance characteristic or shock wave transmission characteristic that matches the acoustic impedance characteristic of the work-piece supported thereon whereby shock waves moving from the work-piece to the anvil will not be reflected back to the work-piece. The impedance of a material may be mathematically defined as being the product of the velocity of sound in the material and the density of the material. Thus, where the velocity of sound in a material is $c$ and the density is $\rho$, the shock wave impedance is $c\rho$.

It has been found that superior welds may be provided if the work-pieces being joined do not melt as they are joined. In certain applications of the invention such as in low melting alloys, it has been found to be desirable to prevent such melting by pre-cooling one or both of two-work-pieces being welded. Thus, it is a further object of the invention to provide an explosive welding technique which minimizes work-piece melting by pre-cooling. More particularly, it is an object to provide a method and means for initially cooling the work-pieces to be welded substantially below the normal or room temperature, and then to conduct an explosive welding operation such that the temperature during and immediately after the welding operation will not be unduly elevated.

Another object of this invention is to provide an improved method and means for welding three or more members together in a single explosive welding operation. More particularly, it is an object to place a plurality of members in stationary positions standing off from each other, and to provide a flying member to be driven by an explosive charge into impact with a first of the stationary members to transfer momentum thereto whereupon the first stationary member is driven into impact with a further stationary member. By this method and means of welding, a final welded product may be formed of several laminated metals.

Yet another object of this invention is to provide an improved method and means for explosive welding wherein two metallic members are driven together by an explosive charge such that an impact is first made at one point or line on the surfaces to be welded and whereby the impact line moves across the surfaces at a sub-sonic rate. One method and means for providing a sub-sonic moving line of impact is to position a flying member over a stationary member with an angle of tilt. Another method and means for providing the sub-sonic moving line of impact is to provide a non-uniform distribution of explosive charge to drive different parts of the flying member toward the stationary member with different velocities. A further method for providing a sub-sonic moving line of impact is to use a low detonation velocity explosive. Thus, it is a more particular object of this invention to provide a distribution of explosive charge such that one part of the flying member will have a greater velocity and will first impact against the stationary member, while other parts will have lesser velocities, and will impact against the stationary member at later times to create a line of impact which moves at a sub-sonic rate.

Another object of this invention is to provide improved methods and means for explosive welding of members having geometric forms such as hollow cylinders and semi-cylinders, dome shaped protrusions and others. More particularly, it is an object to provide an arrangement for welding a liner member in a cylinder or half cylinder to provide a shaft bearing for a rotary machine. A conical shaped liner may be inserted into the cylinder and an explosive charge may be placed within the liner. Upon detonation, the explosive drives the liner against the cylindrical surface and a line of impact moves at a sub-sonic rate from one end to the other thereby welding the liner to the cylindrical surface. The moving line of impact may also be accomplished if a cylindrical (rather than conical) liner is spaced within the cylindrical or semi-cylindrical opening and a slow detonation explosive is used. In this case, the detonation rate of the explosive must be sub-sonic. Another more specific object provides a method and means for welding a liner member within a semi-cylinder surface of an outer member by spacing the liner off center with respect to the outer semi-cylinder. Thus, the liner is positioned nearer to a first side of the outer member than to the opposite side. If the spacing between the liner and the outer cylinder increases uniformly around the liner, the explosive charge may be detonated on the first side, and a line of impact may move around the liner at a sub-sonic rate to provide a superior weld.

Numerous other objects and advantages will be apparent throughout the progress of the specification which follows. The accompanying drawings illustrate certain exemplary embodiments of the invention and the views therein are as follows.

Figure 1A:
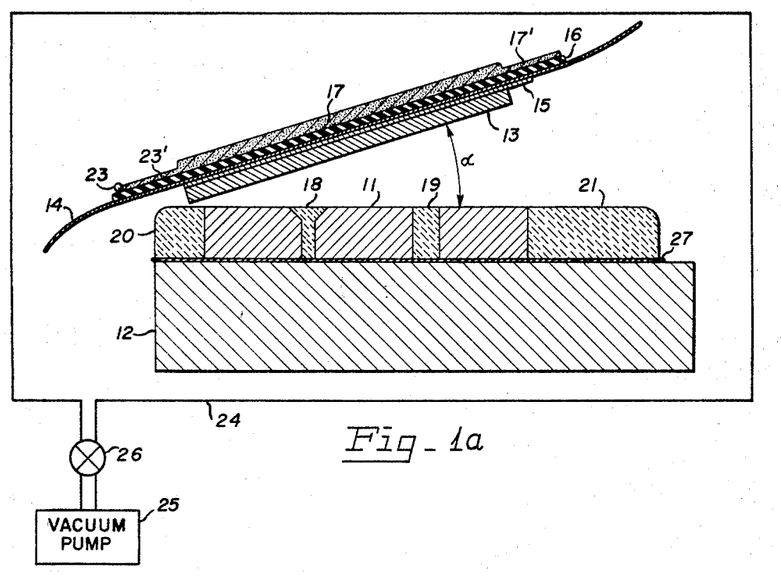
FIGURES 1a and 1b are cross sectional views of an arrangement of welding metallic members in accordance with the teachings of this invention—FIGURE 1a showing the arrangement of parts prior to the detonation of the explosive charge, and FIGURE 1b showing the progressive deformation of the members as the charge is being detonated.
Figure 1B:
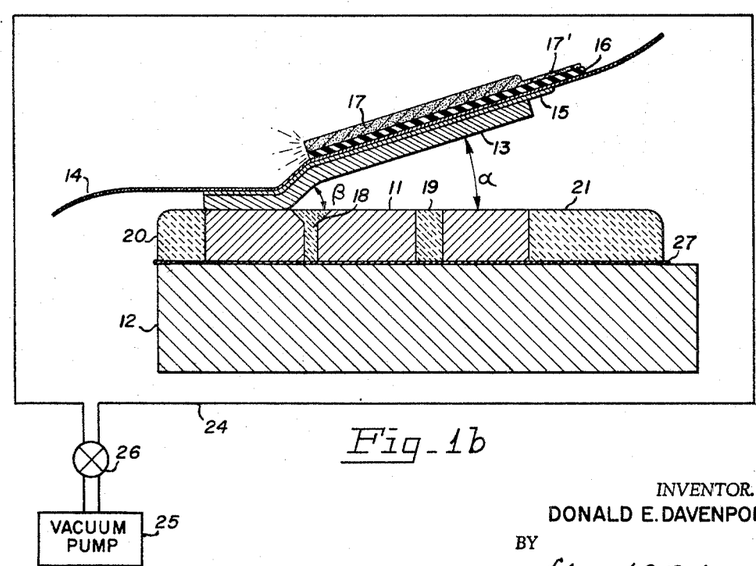

Briefly stated, according to this invention, a first member or stationary work-piece 11 rests upon an anvil or supporting member 12. A second member or flying work-piece 13 is spaced from the stationary member 11. A gas shield 14 may provide temporary support for the member by means of a layer of glue or other adhesive 15. A rubber pad or other explosion attenuator 16 may rest upon the supporting gas shield 14, and a layer of sheet explosive 17 may rest upon the attenuator 16. When detonated, the explosive layer 17 throws or drives the flying member 13 into impact with the stationary member 11 such that a line of impact moves across the work-pieces 11 and 13 at a sub-sonic rate as shown in FIGURE 1b. Before detonation, the atmosphere is evacuated from the space between the members 11 and 13; and during detonation, the gases generated by the explosion are prevented from entering the space between the members by the gas shield 14 which lengthens the path which gas molecules must traverse from the detonating explosive. A low melting temperature alloy may be used to fill cavities and irregularities 18 and 19 in the members 11 or 13, and may be further used as momentum traps 20 and 21 to prevent spalling of the edges of the work-pieces. To prevent bending of the work-pieces, the impedance characteristic of the anvil 12 and of the momentum traps 18, 19, 20 and 21 may be matched to the impedance of the work-piece 11.

Figure 3:
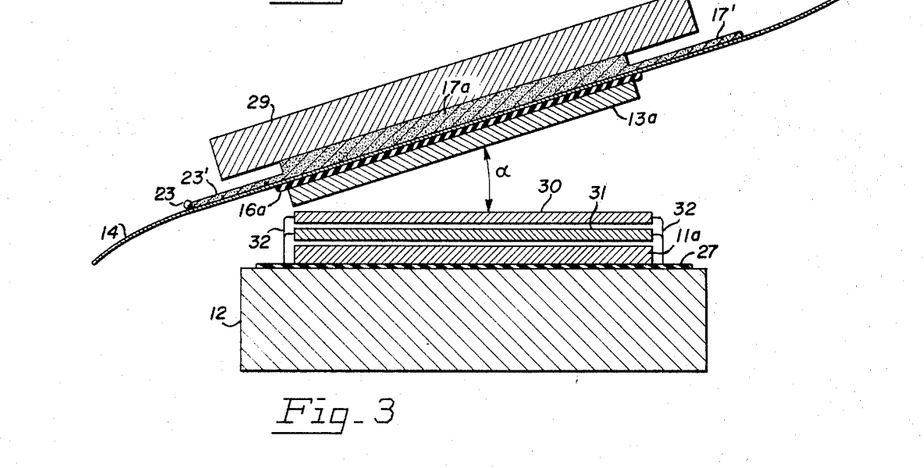
FIGURE 3 is another arrangement for the welding of metallic plates wherein it is desired to weld more then two plates together.

Heat generated by explosive welding has been estimated to elevate the temperature of the work-pieces to between 100° C. to 300° C. Although these are low temperatures for welding operations, the temperatures may be maintained not substantially higher then room temperature by pre-cooling the work-pieces by a means such as liquid air just prior to the detonation. If it is desired to weld more then two members together ,al lof the members can be supported as shown in FIGURE 3. Upon detonation of the explosive, the momentum of the driven upper member 13a will be conducted to the other members 30, 31, etc. to weld all of the members together. To accomplish a superior weld, the line of impact must move at a sub-sonic rate across the work-pieces. This may be accomplished by several methods and means, for example: by positioning or standing the work-pieces off from each other at an angle; by providing a distribution of explosive charge which creates a velocity gradient whereby a part of the flying work-piece is driven at a greater speed then another part; or by providing an explosive having a detonation rate which is sub-sonic.

As shown in FIGURE 1a, the first metallic member 11 to be welded rests upon the anvil 12. The second metallic member or plate 13 is positioned over the first work-piece extending upwardly through an angle $\alpha$. In the drawings, the angles $\alpha$ and $\beta$ are shown greatly exaggerated for purposes of illustration. A gas shield 14 may be of a relatively thin sheet metal but will extend a substantial distance beyond the limits of the stationary work-pieces 11 or 13. The gas shield 14 may provide an initial or temporary support for the flying work-piece 13 which may be attached thereto by a layer of plastic, glue or the like 15. A sheet of material such as rubber 16 overlies the gas shield and provides attenuation for the explosive charge. The explosive material may be in the form of sheets 17 lying over the rubber attenuator 16.

The stationary work-piece 11, shown by FIGURE 1a, may include one or more cavities or openings 18 and 19. Prior to the explosive welding operation, the openings may be filled with an alloy that melts at a low temperature such as Wood's metal, Rose's metal or the like. One low melting temperature alloy which has been found to be satisfactory for this purpose, is sold under the trade name Cerrobend by the Cerro de Pasco Company. In addition to possible holes and openings 18 and 19, a further buttressing mass of low melting point metal may be placed around the edges of the stationary work-piece 11 as shown at 20 and 21. Such a buttressing mass of metal at the edge of the work-piece is known as a momentum trap and provides an effective continuation mass from the edge of the work-piece 11 to receive and carry away an explosive shock wave which may otherwise cause a spalling at the edge of the member 11.

The explosive charge 17 may be detonated by an appropriate detonator 23 at one side of the flying member or work-piece 13 which lies in closer proximity to the stationary work-piece 11. With the work-pieces, gas shield, attenuator explosive charge and detonator arranged as in FIGURE 1a, the surrounding atmosphere is evacuated from a chamber 24 by a vacuum pump 25 through a valve 26. When the pressure has been reduced, to approximately 1/1000 atmospheres or less, the explosive may be detonated to accomplish a welding operation.

As shown in FIGURE 1b, the detonation sweeps across the explosive sheet 17 at a velocity of approximately 20,000 feet per second creating an explosive force which drives the work-piece 13 downwardly against the stationary work-piece 11. Because of the deformation of the flying member 13, a dynamic angle of impact $\beta$ appears which is somewhat greater than the static angle $\alpha$. The work-piece 13 is being driven downwardly with a velocity in the range of 1,000 to 1,500 feet per second while the explosive charge 17 and the underlying rubber attenuator 16 is being consumed by the detonation. High velocity gas molecules are generated by the detonation and the gas shield 14 is provided to extend the path that the gas molecules must traverse in order to enter into the space between the work-pieces 11 and 13. By extending the path to be traversed by the gas molecules from the detonation, sufficient time is provided for completion of the explosive weld before an unduly great amount of gas enters the space between the members.

In applications of the invention where the gas shield is interposed between the explosive and the flyer, or movable work-piece 13, it is desirable that the explosive be generally, but not exactly co-extensive with the area of the flyer piece 13 against which the explosive is intended to act. By having the explosive force gradient across the shield 14 gradually reduced rather then stopped suddenly, some explosive force will tend to drive the extending area of the gas shield. If the extending area of gas shield 14 is not driven, and only the area of the gas shield between the explosive and the flyer is driven, it is sometimes possible for the extending area of the gas shield to be sheared off. Thus, as shown at 17' in FIGURE 1a, the lower sheet of explosive 17 which is shown as comprising two superimposed sheets, extends beyond an edge of piece 13 with the extending portion of explosive charge 17 having lesser thickness than that behind flyer plate 13, as shown, so that the change in pressure across the gas shield is less abrupt. Similarly, a detonating cap 23 ignites a portion of the explosive charge of reduced thickness at 23'. The portion of the explosive 23' constitutes a line wave generator which will be more fully described in connection with FIGURE 9.

After the work-piece 13 has been driven down upon and welded to the stationary work-piece 11, the two members will be bonded through the full area therebetween. A weld may also be effected between the flying work-piece or member 13 and the surface of the low melting point metals in the areas 18, 19, 20 and 21. The bonded work-pieces 11 and 13 may thence be raised to a slightly elevated temperature of the order of the boiling point of water, 100° C., whereupon the alloy material will melt away from the work-pieces and leave the cavities 18 and 19 as originally formed therein.

The momentum traps 20 and 21 about the edges of the work-piece 11 will likewise be removed by the slightly elevated temperature. As an alternative, the stationary work-piece 11 may be initially somewhat larger then ultimately desired and the buttressing mass 20 and 21 of the momentum traps may be eliminated. In this case, a certain amount of spalling and imperfect welding will be encountered about the edge or periphery of the work-piece 11. A subsequent machining operation may remove the excess material and provide clean edges as desired.

In order to obtain a good weld bond, it is desirable that the metal flow of the two work-pieces occur due to cold working rather then melting, as melting undesirably changes the characteristics of the work-pieces in the vicinity of the joint, much as annealing would. In accordance with the invention, and particularly when welding metals having a low melting point, melting in the vicinity of the joint may be effectively obviated by pre-cooling of one, or preferably both, of the work-pieces. Such pre-cooling may be done effectively and rapidly by immersing such work-pieces briefly in liquid air or liquid nitrogen on the like before placing them in the vacuum chamber on the anvil. The use of a vacuum in the chamber 24 is advantageous because the pre-cooled pieces will be thermally insulated in the vacuum, and will not heat up as quickly as in air. A layer of glue or Mylar 27 functions to prevent accidental welding which may otherwise occur between the stationary work-piece 11 and the anvil 12. In addition, the Mylar 27 serves to thermally isolate the work-pieces from the anvil, preventing the heat from the relatively massive anvil from heating the pre-cooled work-piece 11 prior to detonation.

There are several different types of sheet explosives which have proved satisfactory for use as the explosive charge 17. A preferred explosive is pentaerythrite tetra-nitrate, more commonly known as PETN. This explosive is commonly fabricated in sheets of material 0.2 inch in thickness, and may be easily rolled into other thicknesses. A plurality of sheets may be placed together when additional explosive force is needed. A composition of the sheet material comprises 30% plastic binder and 70% PETN explosive. Another explosive which is suitable for welding applications is cyclotrimethylenetrinitramine, commonly known as RDX. A further explosive which has been used is nitroguanadine. Yet another satisfactory explosive is ammonium picrate, more commonly called picric acid.

Figure 2:
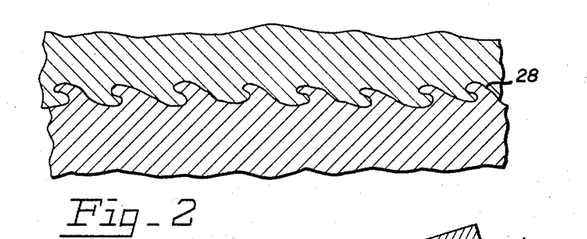
FIGURE 2 is a representation of a microphotograph of the boundary between two bonded members which have been welded in accordance with this invention.

An ideal bond between two members is achieved when the cold flow resulting from the impact between the two members provides a rippled surface 28 on each of the mating surfaces of the nature shown in FIGURE 2. It will be seen in FIGURE 2 that elevation and depressions in one of the members conform to depressions and elevation, respectively, in the other member, so that the two members are effectively interlocked. In order that such rippling be obtained from the impact between the two pieces, it has been found that an instantaneous line of impact between the two pieces should progress across the mating surfaces at a speed which is less then the speed of sound in the two metals. Although a mechanical interlocking may be desirable, the primary advantage of rippling is to form new surface to aid the bonding of the metals. The line of impact may be made to travel with a limited velocity either by selection of an explosive which burns at such a limited velocity, or alternatively, by angularly arranging and spacing the surface of one work-piece with relation to the other, or by providing means, such as a tapering explosive (FIGURE 4) for throwing the flying member at varying velocity.

The detonation of an explosive generates a series of shock waves. Shock waves are intense waves of compression and expansion which travel approximately at the speed of sound. Sound wave and shock waves require a medium for transmission, and the medium with which we are concerned in this invention is that of the metallic members 11 and 13. In ordinary metals, the velocity of sound is approximately 15,000 feet per second. As indicated above, the velocity of the line of impact between the member 11 and 13 must be sub-sonic, and therefore, must be less then 15,000 feet per second for welding most metals.

From this we may deduce that the shock waves resulting from the detonation and the impact will move faster then the sub-sonic line of impact. The shock waves cause the rippling effect 28 shown in FIGURE 2 at a time just before the two surfaces close together. Although the crest to trough amplitude of the ripples is of the order of 0.001 inch, a considerable amount of new surface is formed just before the members 11 and 13 close together. In this instant, the oxides or corrosive coating which usually appear as a tarnish on metals have not covered the newly formed surfaces. Therefore, the work-pieces 11 and 13 impact together upon bright newly formed surfaces with an explosive force which has been estimated to be of the order of 1,000,000 pounds per square inch. With newly formed surfaces impacting with such forces, the molecules of one member become intimately bonded to the molecules of the other member in a superior weld. FIGURE 2 is a representation of a microphotograph of the bond between two explosively welded members. It is interesting to note that the elevations and depressions of one of the members corresponds exactly with the depressions and elevations of the other member to create an interlocking of the members in addition to the normal welding and bonding which exists between the molecular structures of the two members. It is further interesting to note that no voids or gaps exist between the members as would be the case if gases were trapped between the members.

When using prior art explosive welding techniques, it has been found that the shock wave passing from the stationary work-piece to the anvil frequently has resulted in a reflected shock wave, and such reflected shock waves frequently have been sufficient in magnitude to bend the stationary work-piece. In accordance with the present invention, such reflected shock waves are eliminated or substantially lessened by using an anvil which has a shock impedance which matches that of the stationary work-piece. The shock impedance of a piece of material is defined as the product of C, the velocity of sound in the material, times $\mathfrak{d}$, the density of the material. Because shock impedance is a function of both sound velocity and density, it will be seen that the anvil need not be made of the same material as the stationary work-piece, and an anvil constructed of a metal having a greater density, for example, then that of the stationary work-piece may be used if the anvil metal has a proportionately lesser sound velocity then that of the work-piece thereby rendering the shock impedance approximately the same.

As shown in FIGURE 3, it is possible to weld more then two members together in a single explosive welding operation. As in the prior embodiment, an anvil 12 supports a first work-piece 11a on a pad of glue or Mylar 27. The flying member or workpiece 13a is supported by the gas shield 14 which is spaced above the stationary work-pieces at an angle α. An explosive charge 17a overlies the gas shield 14 and is generally co-extensive in area to that of the flying work-piece 13a; although a reduced thickness of explosive 17' extends from a termination side while a further reduced thickness 23' extends out to the detonator cap 23. In FIGURE 3, a rubber pad or attenuator 16a is placed beneath the gas shield and over the flying work-piece 13a. The attenuator may be positioned either over or under the gas shield 14 as desired since it will function in either position to reduce somewhat the maximum explosive force, but will extend the effective time duration thereof. Thus, in FIGURES 1a and 1b, the attenuator 16 is shown positioned between the explosive charge 17 and the gas shield 14, but in FIGURE 3 the attenuator is shown on the other side of the gas shield. FIGURE 3 further differs from the arrangement of FIGURES 1a and 1b by the use of a recoil or reactance block 29 overlying the explosive charge 17a. The block 29 enhances the explosive force by providing some mass against which the explosive gases may react to direct more force downwardly. In practice, it has been found that the block 29 may be made of rubber to decrease the projectile effect of the block 29. Obviously, since the block 29 lies over the explosive charge 17a, the block 29 will be thrown upwardly by the explosion and may damage the roof of the evacuated chamber unless a relatively compressible substance such as rubber is used.

In FIGURE 3, two intermediate work-pieces 30 and 31 are spaced between the stationary work-piece 11a positioned on the anvil 12 and the flying work-piece 13a. End supporting means 32 are provided for holding the intermediate work-pieces 30 and 31 in a standoff position spaced away from the work-piece 11a and away from each other. As shown in FIGURE 2, the temporary supporting means for the intermediate work-pieces 30 and 31 may be wires, or alternatively, may be light plastic clamps. When the explosive charge 17a is detonated, the flying work-piece 13a will be driven into impact with the first work-piece 30. A large part of the momentum of the work-piece 13a will be transferred to the work-piece 30 which will likewise be driven downwardly to impact the work-piece 31. Similarly, the work-piece 31 will acquire momentum and will be driven into impact with the stationary work-piece 11a. By this method and means of explosive welding, several plates may be welded together in a final sandwich-like body. The various work-pieces may be of similar materials as indicated by the cross hatching of FIGURE 3, or alternatively, plates of different materials may be sandwiched together into and welded into a single body.

Figure 4:
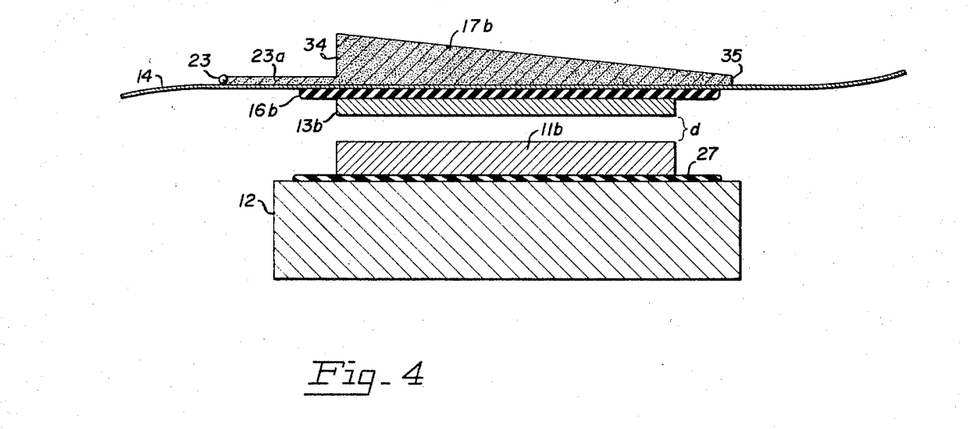
FIGURE 4 is yet another arrangement for welding metallic members using a tapered thickness of explosive.

FIGURE 4 shows a method and means for explosive welding wherein a flying work-piece 13b is suspended from the gas shield 14 with a uniform separation d or standoff over a stationary work-piece 11b. In this case, an explosive charge 17b is formed with a variable thickness or gradient overlying the gas shield 14. As in the prior embodiments, a detonating cap 23 and a line wave generator 23′ may be used to ignite an initial side 34 having a maximum thickness of explosive. The explosive layer 17b is reduced in thickness with a uniform gradient to a termination side 35. The explosive force acting downwardly through the gas shield 14 and the attenuator 16b will likewise have a gradient from the starting side 34 to the terminal side 35. It has been computed that the initial side of the flying work-piece 13b (to the left in FIGURE 4) may be given a downwardly velocity of approximately 1,500 feet per second by the explosive force at the starting side 34. The explosive force will be less as the detonation advances across the charge 17b, and at the trailing side (the right side as shown in FIGURE 4) of the work-piece 13b will be given a downward velocity of approximately 1,000 feet per second. It has been further computed that if the uniform standoff distance is of the order of 1 inch, the work-piece 13b will be driven into impact with the work-piece 11b at starting side thereof, and that a line of impact will move across the two work-pieces (from left to right as shown in FIGURE 4) at a sub-sonic rate. Since the impact will move across the two work-pieces at a velocity of less then the speed of sound, the two surfaces will be joined by a weld which may have ripples as shown by FIGURE 2.

An alternative arrangement could provide a flying work-piece 13b which is tapered, to vary the mass per unit area thereof. A further alternative arrangement could provide a tapered attenuator or other inert sheet to vary the effective mass per unit area of the work-piece 13b. In each case, a variable velocity will be imparted to the work-piece 13b such that a moving line of impact may be established.

Figure 5:
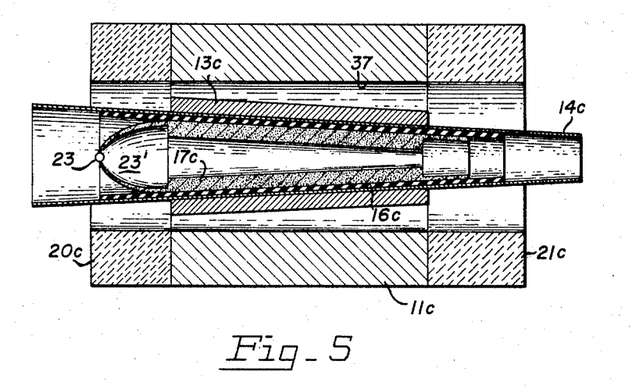
FIGURE 5 is an arrangement for welding an internal liner within a hollow cylinder or semi-cylinder.

FIGURE 5 shows a first method and means for welding a liner within a hollow cylinder or semi-cylinder. As shown in FIGURE 5, a first member 11c may contain a cylindrical opening 37 wherein it is desired to weld a liner which may be of a different material to form a machine part such as a bearing for rotary support of a shaft or the like. The liner 13c may be initially conical in shape; and a conical gas shield 14c is inserted through the liner 13c and through the cylindrical opening 37. The standoff angle $\alpha$ is effectively provided by forming the flying work-piece 13c as a cone while the stationary work-piece 11c has a cylindrical shape 37. An attenuator of rubber or the like 16c is positioned within the gas shield, or alternatively, may be positioned around the gas shield 14c but within the liner member 13c. The explosive charge 17c is likewise formed in a conical shape and inserted within the attenuator 16c and the gas shield 14c. As in the prior embodiment, the explosive charge 17c is of uniform thickness over an area which is substantially co-extensive with the flying member or liner 13c, but a reduced area is provided at both ends thereof. A detonating cap 23 is positioned to detonate line wave generator 23′ which in this case must develop into a circle or semi-circular form to join with the principal conical shaped charge 17c. During the welding operation, the charge is detonated at the enlarged end (left side as shown in FIGURE 5) into conical shaped explosive, and the detonation will sweep from one end to the other. The liner member 13c will be thrown outwardly to impact with the cylinder walls of the member 11c, and a line of impact will progress from one end of the cylinder to the other (left to right as shown in FIGURE 5). The explosive force will expand and impact the liner member 13c against the cylinder walls 37.

Figure 6:
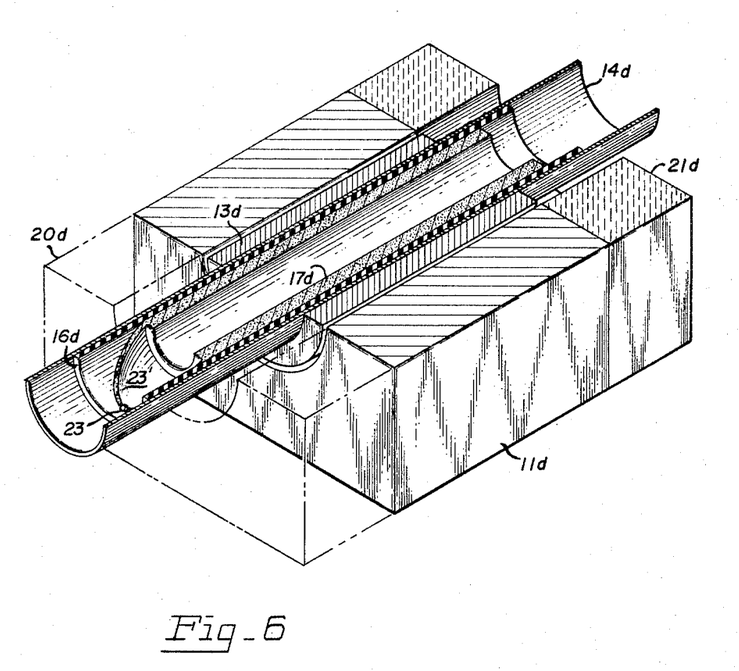
FIGURE 6 is another arrangement for welding an internal liner in a cylinder or semi-cylinder.

FIGURE 6 illustrates an alternative method for lining a cylindrical or a semi-cyindrical opening. In this case, the liner member 13d is cylindrical in shape but of a smaller diameter such that a standoff distance or space will be provided between the members to be welded, 13d and 11d. Similarly, the gas shield 14d, the rubber attenuator 16d and the explosive charge 17d are all of cylindrical shape positioned one inside of another. By a proper addition of impurities, or by variation of the density of the explosive material or by a proper choice of explosive, the detonation rate of the explosive charge 17d may be reduced to a value less than the speed of sound in the metals. When the charge is detonated by the detonator cap 23 and line wave generator 23′, a line of detonation will move at a sub-sonic rate from one end of the cylinder to the other, and the liner 13d will be thrown outwardly against the cylindrical wall of the member 11d to form a line of impact which moves at a sub-sonic rate corresponding to the detonation rate of the explosive.

FIGURES 5 and 6 are hatched to indicate a full section through an assembly which may include a method and means for lining a complete cylinder. If it were desired to line a half cylinder, the parts may be arranged in initially the same assembly, but in this case, exposed surfaces would be as shown in FIGURES 5 and 6 without the sectional cross hatching. Therefore, FIGURES 5 and 6 may be construed as showing methods and means for lining surfaces of full cylinders and partial cylinders. It will be appreciated that the explosive force acting within the cylindrical liners will effectively throw the parts of the cylinder outwardly from the center, whereby the liner member will be enlarged from the original size thereof.

Figure 7:
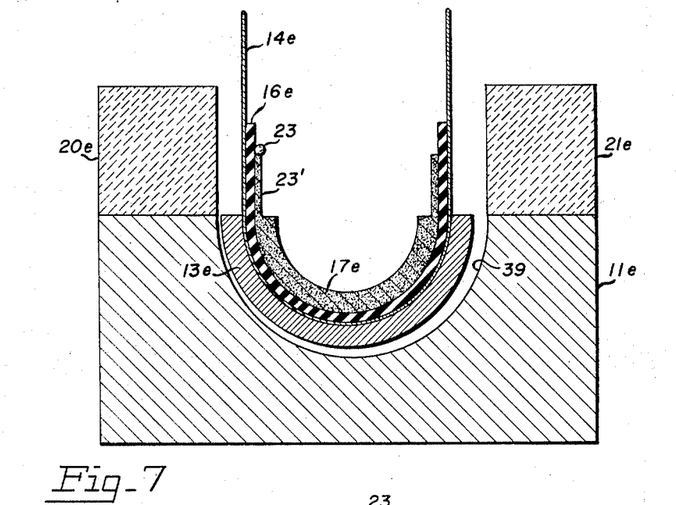
FIGURE 7 is yet another arrangement for welding a liner member within a semi-cylinder.

Another method and means for welding a lining in a semi-cylinder is shown by FIGURE 7. In this case, a stationary work-piece 11e is formed with a half cylindrical surface 39 into which a half cylinder liner member 13e is spaced away from the cylinder walls 39. Within the liner 13e, a gas shield 14e may be positioned together with a rubber attenuator pad 16e. The explosive charge is formed as a semi-cylinder within the gas shield 14e and the attenuator 16e. The explosive charge 17e may have a uniform thickness which is substantially co-extensive with the liner member 13e and may have extending end portions of reduced thickness to avoid shearing the gas shield 14e.

As shown in FIGURE 7, the liner member 13e is of a reduced diameter with respect to the cylindrical surface 39 and is held in a position which is somewhat eccentric with respect to the outer cylinder 39. As in the embodiments discussed heretofore, the gas shield 14e may constitute the temporary supporting means which supports the entire explosive assembly such that the initial impact or starting side of the liner member 13 is held nearer to the cylinder wall 39 then the terminal side thereof. Thus, an effective angle $\alpha$ between the flying work-piece 13e and the stationary work-piece 11e is inherent in respective positioning of the work-piece since the spacing between the members 11e and 12e increases gradually from one side to the other. As the explosive charge is detonated from the detonator 23 and the line generator 23′, a line of impact will sweep along the two work-pieces 13e and 11e (from left to right as shown in FIGURE 7) at a sub-sonic rate. As indicated heretofore, a superior weld will result if the velocity of the line of impact is sub-sonic.

Figure 8:
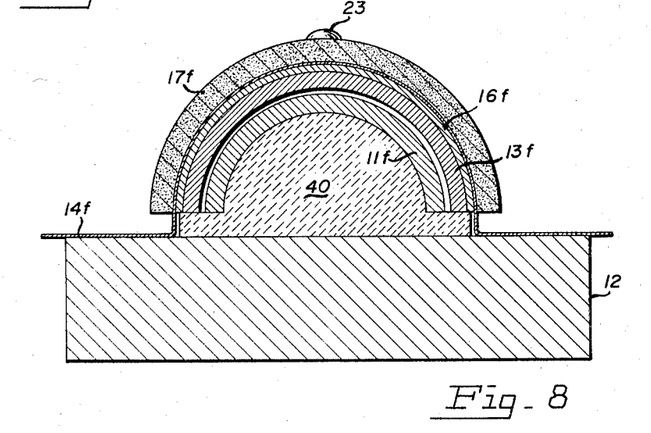
FIGURE 8 is an arrangement for welding a metal cladding on a protruding member such as a dome or hemisphere.

Further geometric shapes may be welded by explosive welding techniques, and FIGURE 8 is an example of welding a metal cladding to a hemispherical dome or the like. In this case, a stationary work-piece 11f may be hollow in which case the cavity therein will be filled with a low melting point material as a momentum trap 40.

Obviously, if the dome 11f were solid, it could rest directly upon the anvil member 12 without the use of the material 40. A flying member or second work-piece 13f is placed over the stationary work-piece 11f and is dimensioned such that a standoff gap or space will lie between the members 11f and 13f. Over the flying work-piece 13f is placed a dome shaped attenuating pad 16f and a gas shield 14f. As in the previous embodiments, the gas shield may function as a temporary support for the other movable members of the assembly, although the temporary support may not be a problem for the configuration shown in FIGURE 8. The explosive charge 17f extends uniformly over the gas shield and is substantially co-extensive with the flying work-piece 13f. A detonator cap 23 may be placed directly on top of the assembly at the center thereof whereby the detonation of the explosive will occur first at the top and center of the work-piece 13f. A line or ring of detonation will move therefrom outwardly and downwardly such that the work-piece 13f will be caused to impact against the work-piece 11f first at the top and center and thence along a circle expanding to the edges. In this embodiment the explosive charge 17f should be of such a composition and density as to detonate at a rate which is less then the speed of sound in metals such that the line of impact between the two work-pieces 13f and 11f will likewise move at a sub-sonic rate.

Figure 9:
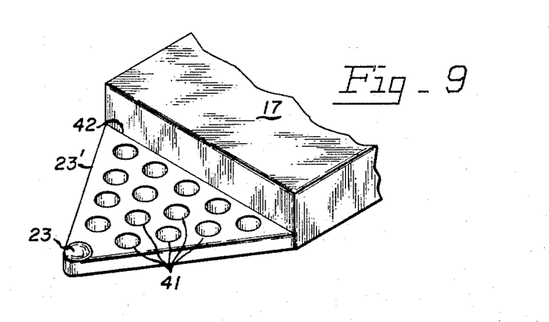
FIGURE 9 shows a line wave generator which may be used for detonation of an explosive sheet charges used in this invention.

FIGURE 9 illustrates one form of line wave generator, a method and means for detonating an explosive charge 17 with a straight line front which may sweep along the remainder of the charge maintaining the line front. A detonating cap 23 will provide an initial explosive of low intensity which functions to detonate the secondary explosive comprising the principal charge 17. Ordinarily, the detonation will proceed at a uniform rate from the detonating cap 23 and would therefore move outwardly in an expanding circle. The line wave generator 23' may be a generally triangular shaped mass of explosive material of the same type which is used in the principal mass 17. A series of holes 41 are formed into the explosive material in a regular geometric pattern of equilateral triangles as shown in FIGURE 9. Alternatively, the explosive material may be impregnated with masses of an inert material which is spaced in the geometric pattern as the holes 41. As the detonation moves away from the cap 23, the circular wave front is interrupted by the pattern of holes. The detonation spreads around the holes and along paths between the holes which become the sides of equilateral triangles. The time required for the detonation to spread along triangular paths from the detonation point 23 to a line 42 will be substantially equal for all points along the line. Therefore, the detonation front will be a straight line when it first encounters the thickened explosive material 17 at the line 42. Indeed, the detonation front will substantially coincide with the line 42 at the time when the principal mass of explosive is caused to detonate, and the linear detonation front will then pass across the remaining explosive charge. Ordinarily, about 10 microseconds of time is required to form a linear detonation front from an initial ignition of the cap 23. In ordinary PETN explosive sheets, a detonation front will travel at a velocity of approximately 7 mm. per microsecond or 23,000 feet per second. This detonation rate may be slowed to less than the velocity of sound (approximately 15,000 feet per second in metals) by introducing impurities into the explosive mixture or by varying the density or compactness in which the particles of explosive PETN are packed together in the explosive mixture.

As discussed heretofore, means must be provided for evacuating the atmosphere from the space between the work-pieces. FIGURES 1a and 1b illustrate at least symbolically, the use of an evacuated chamber. Although not actually shown, it will be understood that similar means for evacuating an atmosphere will be used in connection with the further embodiments illustrated by FIGURES 3, 4, 5, 6, 7 and 8. It is further understood that momentum traps of a low melting point metal may be further used in connection with the embodiments of FIGURES 3, 4, 5, 6, 7 and 8.

In summary, it may be appreciated that the explosive welding process taught by this invention involves the impact between two metallic members such that a line of impact is created and would move at a sub-sonic rate. Gas molecules are excluded from the space between the members by providing an evacuated chamber, and by providing a gas shield. In the embodiments of FIGURES 1a, 1b, 3, 5 and 7 the generation of a line of impact moving at sub-sonic rate is accomplished by standing a flying work-piece off from a stationary work-piece at an angle $\alpha$. In these embodiments, the detonation rate of the explosive may be greater than the speed of sound, but the effect is to impart a velocity to the movable or flying member 13. Since the flying member must move through the standoff space before impact with the stationary member, a gradient of delay of impact results in a gradient of increasing spacing between the members. In those embodiments where the flying work-piece is pre-positioned at an angle $\alpha$, it must be appreciated that an initial impact is made near a detonation point and that the progression of the impact is a function of the spacing between the members to be welded effectively, slows down the effect of a fast detonation rate to obtain a sub-sonic velocity of a line of impact between the members. Successful explosive welding operations have been accomplished when the angle $\alpha$ was made as small as 1°, and when the angle $\alpha$ has been increased to more than 10°. Although an optimum angle $\alpha$ is believed to be of the order of 2° to 3° for military explosives and ordinary metals, the limits thereof appear to vary widely. As shown in FIGURE 1b, the flying work-piece 13 strikes the stationary work-piece 11 at a dynamic angle $\beta$ which is substantially more than static angle $\alpha$. It is believed that the angle $\beta$ in most instances is 3° to 5° greater than the angle $\alpha$. The significance of the angle $\beta$ lies in the fact that the work-piece 13 impacts against the work-piece 11 with a considerable shear force tending to flow the metal of the stationary work-piece in the direction of the line of impact. Although a large angle $\beta$ may establish a greater rippling effect because of horizontal shock waves tending to shear the work-piece 11, this large angle $\beta$ will have a detrimental effect in tending to stress the weld and shear it apart.

As indicated heretofore, the optimum angle $\alpha$ between the members to be welded is determined by the selection of an explosive to be used and by the metals to be welded. If the explosive to be used has a detonation rate which is less than the velocity of sound in the metals, the angle $\alpha$ may be zero and the work-pieces may be disposed parallel with each other. If the angle $\alpha$ is increased, a limit may be reached when the tangential forces become great enough to shear the metal in the plane of the weld. This limitation may be defined such that the tangential momentum per unit area per unit time must be less than the shear strength of the material.

To produce a superior weld, the work-pieces must be spaced apart by a distance such that the flying work-piece will acquire a velocity of the order of 1,000 feet per second or greater before impact. In practice it has been found that a spacing of the order of one millimeter has produced satisfactory welds. The explosive force accelerates the flying work-piece via a series of shock waves. When a first shock wave of compression moves downwardly through the flying work-piece, the lower surface thereof is accelerated, thence a reflected shock wave of rarefaction moves upwardly to the top of the work-piece and thence a second shock wave of compression moves downwardly to the lower surface, etc. Each succeeding shock wave adds to the velocity of the lower surface by lessening degrees. To obtain substantially the full energy of the explosive charge, sufficient acceleration space should be provided whereby the shock wave can transverse down and up through the flying work-piece approximately four or five times. While a spacing of the order of one millimeter will produce a good weld by imparting a sufficient velocity to the flying member with a minimum amount of explosive, the same effect may be obtained with less spacing and a greater amount of explosive. Thus, if the first shock wave were sufficient to impart a velocity of the order of 1,000 feet per second to the surface of the workpiece, a weld may be accomplished with a minimum spacing between the work-pieces.

The amount of explosive energy required for a welding operation is dependent upon the mass of the flying workpiece. Thus, if the upper work-piece were thicker and heavier, a correspondingly greater amount of explosive would be required to effect a weld. Using an explosive such as PETN (sold by Du Pont Company as EL 506) and a flying work-piece of steel, it has been found that the thickness of the explosive layer 17 should be substantially the same thickness as the steel work-piece 13. If the flying work-piece were of a light metal such as aluminum, the thickness of the explosive layer may be considerably reduced.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A method for welding a first metallic member to a second metallic member; comprising the steps of: cooling the members placing the first member in spaced relation with the second member; evacuating the atmosphere from the space between the members; and detonating an explosive charge against the first member to drive the first member against the second member.

2. A method for welding a first metallic member to a second metallic member comprising the steps of: providing an anvil having substantially the same acoustic impedance as the first member; placing the first member upon the anvil; placing the second member in a position spaced from the first member; providing a gas shield positioned over the first member for temporary support of the second member; and detonating an explosive charge against the gas shield to drive the second member against the first member to create an impact between the members, said gas shield effectively extending the path for gas molecules to travel between the explosive charge and the space between the first and second members.

3. A method for welding a first metallic member to a second metallic member comprising the steps of: providing an anvil having substantially the same acoustic impedance as the first member; filling cavities in one of the members with a low melting temperature alloy; placing the first member upon the anvil; placing the second member in a position spaced from the first member; detonating an explosive charge against the second member to drive the second member against the first member to create a line of impact between the members; said line of impact being caused to travel at a sub-sonic rate across the first member to weld members together; and raising the temperature of the welded members to melt the alloy from the cavities.

4. A method for welding a first metallic means to a second metallic means comprising the steps of: supporting the second member at an angle relative to the first member such that the relative spacing between the members is less at a first side than it is at the opposite side thereof; providing a gas shield over the second metallic member and detonating an explosive over the gas shield to drive the second member into impact with the first member, said explosive being detonated from the first side of the members such that the first side of the second member impacts the first member along a line which moves across the two members from the first side to the opposite side at a sub-sonic rate.

5. A method for welding a first metallic member to a second metallic member comprising the steps of: placing the first member upon an anvil; placing the second member at an angular position with respect to the first member; evacuating the atmosphere from the space between the members; providing the gas shield for supporting the second member in the angular position with respect to the first member; providing a compressible attenuator supported by the gas shield; detonating an explosive charge on the opposite side of the gas shield and the attenuator from the second member to drive the second member into impact with the first member to create a line of impact between the members; said line of impact being caused to travel at a sub-sonic rate across the members.

6. A method for welding a first metallic member to a second metallic member comprising the steps of: placing the first member upon an anvil with a non-metallic material separating the first member from the anvil; placing a second member at an angular position with respect to the first member; evacuating the atmosphere from the space between the members; placing an explosive charge in a position to drive the second member into impact with the first member; providing a compressible attenuator between the explosive charge and the second member; providing a gas shield between the explosive charge and the second member for extending the paths of gas molecules from the explosive charge to the space between the members detonating the explosive charge to drive the second member into impact with the first member to create a line of impact, causing said line of impact to travel at a sub-sonic rate across the members.

7. A method for welding three or more members together comprising the steps of: placing a first of the members upon an anvil; positioning one or more intermediate members spaced apart from the first member and from each other; positioning a flying member in spaced relation to the first member and the intermediate members; detonating an explosive charge to drive the flying member against the intermediate members such that momentum is transferred to drive the intermediate members into impact with the first member to create a line of impact between each pair of adjacent members, causing said lines of impact to move across the members at a sub-sonic rate.

8. A method for welding three or more members together for comprising the steps of: placing a first of the members on an anvil; positioning a second of the members spaced apart from the first member; positioning a flying member at an angle with the first and second members providing an explosive charge for driving the flying member into the second member; positioning a gas shield and an attenuator between the explosive charge and the flying member; evacuating the atmosphere from the spaces between the members; and detonating the explosive charge to drive the flying member into the second member such that a momentum transfer will drive the second member into the first member and will establish lines of impact between each adjacent pair of members; said lines of impact being caused to move across the members at a sub-sonic rate.

9. A method for welding a first metallic member to a second metallic member comprising the steps of: providing an anvil having substantially the same acoustic impedance as the first member; placing the first member upon the anvil; placing the second member in a position spaced from the first member; placing an explosive charge over the second member in a position to drive the second member against the first member; placing a compressible mass of material over the explosive charge to provide a re-action force to drive the explosive energy against the second member; evacuating the atmosphere from the space between the members; and detonating the explosive charge to drive the second member against the first member and to create a line of impact between the members; said line of impact being caused to travel at a sub-sonic rate.

10. A method for welding a first metallic member to a second metallic member comprising the steps of: providing an anvil having substantially the same acoustic impedance as the first member; placing the first member upon the anvil; placing the second member in a position spaced from the first member; and positioning an explosive charge over the second member; said explosive charge having a variable thickness; detonating the explosive charge from a first side having the maximum thickness and permitting the detonation to move across the charge to a side having a minimum thickness; and thereby driving a first side of the second member at a greater velocity then the opposite side thereof whereby a line of impact is created between the members which moves at a sub-sonic rate.

11. A method for welding a first metallic member to a second metallic member comprising the steps of: providing an anvil having substantially the same acoustic impedance as the first member; placing the first member upon the anvil; placing the second member in a position spaced apart from and parallel to the first member; positioning an explosive charge over the second member; positioning a gas shield and an attenuator between the explosive charge and the second member; said explosive charge having a thickness which varies along a gradient from a first side to a second side; detonating the explosive charge from the first side having the maximum thickness and permitting the detonation to move across the charge to a side having a minimum thickness; and thereby driving a first side of the second member at a greater velocity then the oposite side thereof whereby a line of impact is created between the members which moves at a sub-sonic rate.

12. A method for welding a liner member within a cylindrical walled cavity of an outer member comprising: situating the liner member within the cavity spaced apart from the cylindrical walls thereof; evacuating the atmosphere from the space between the liner members and the cylindrical wall of the outer member; detonating an explosive charge to impact said liner member against the cylindrical wall of the outer member with a line of impact between the members travelling at a velocity less then the speed of sound in either of said members; and extending the paths of gas molecules from the explosive charge to the space between the members by providing a gas shield.

13. The method of welding a liner member within a cylindrical walled cavity in accordance with claim 12 and further comprising: shaping the liner member conically; shaping the explosive charge conically; and detonating the explosive charge from an end having a maximum diameter of conical section to expand and impact the liner member against the cylindrical wall with a line of impact travelling at a sub-sonic rate from the end of maximum diameter of the conical section to the end of smaller diameter thereof.

14. The method of welding a liner member within a cylindrical walled cavity in accordance with claim 12 and further comprising: forming the liner member as a cylinder having a smaller outside diameter than the diameter of the cavity; detonating an explosive charge from one end of the cylinder, causing the explosive charge to detonate at a rate that is less than the speed of sound in either of the members whereby the liner member is expanded and impacted against the cylinder wall with a line of impact travelling at a sub-sonic rate from one end thereof to the other.

15. The method for welding a liner member within a semi-cylindrical cavity in accordance with claim 12 and further comprising: forming the liner member as a cylinder having a smaller outside diameter then the diameter of the cavity; positioning the liner member eccentrically within the cavity such that the spacing between the members is less at a first side then at the other side; positioning an explosive charge within the liner member and substantially co-extensive therewith; placing an attenuator and a gas shield between the liner member and the explosive charge; detonating the explosive charge from a first side thereof to expand and impact the liner member against the cylinder wall of the cavity and thereby causing a line of impact to move around the cavity from one side thereof to the other.

References Cited

UNITED STATES PATENTS

| | | | |
|---|---|---|---|
| 3,140,537 | 7/1964 | Popoff | 29—474.3 |
| 3,197,855 | 8/1965 | Carter et al. | 29—493 X |
| 3,197,856 | 8/1965 | Polhemos et al. | 29—470.1 |
| 3,212,183 | 10/1965 | Burman et al. | 29—497.5 |
| 3,258,841 | 7/1966 | Popoff | 29—497.5 |
| 3,263,323 | 8/1966 | Maher et al. | 29—421 |
| 3,292,253 | 12/1966 | Rossner et al. | 29—497.5 |
| 3,313,021 | 4/1967 | Wright et al. | 29—421 |

FOREIGN PATENTS 12,910  4/1962  Japan.

JOHN F. CAMPBELL, *Primary Examiner.*

PAUL M. COHEN, *Assistant Examiner.*

U.S. Cl. X.R.

29—421, 471.1, 497.5